(12) United States Patent
Gaully

(10) Patent No.: US 8,757,018 B2
(45) Date of Patent: Jun. 24, 2014

(54) DEVICE FOR CHANGING THE TRANSMISSION RATIO BETWEEN A TURBINE SHAFT AND A SHAFT OF A STARTER-GENERATOR OF AN AEROENGINE

(75) Inventor: Bruno Robert Gaully, Marolles en Hurepoix (FR)

(73) Assignee: Snecma, Paris (FR)

( * ) Notice: Subject to any disclaimer, the term of this patent is extended or adjusted under 35 U.S.C. 154(b) by 229 days.

(21) Appl. No.: 13/509,388

(22) PCT Filed: Nov. 16, 2010

(86) PCT No.: PCT/FR2010/052432
§ 371 (c)(1),
(2), (4) Date: Jul. 12, 2012

(87) PCT Pub. No.: WO2011/061438
PCT Pub. Date: May 26, 2011

(65) Prior Publication Data
US 2012/0279334 A1 Nov. 8, 2012

(30) Foreign Application Priority Data
Nov. 18, 2009 (FR) ...................................... 09 58154

(51) Int. Cl.
*F16H 37/06* (2006.01)
*F16H 3/08* (2006.01)

(52) U.S. Cl.
USPC .................................. 74/325; 74/661; 74/342

(58) Field of Classification Search
USPC .................................... 74/325, 333, 342, 661
See application file for complete search history.

(56) References Cited

U.S. PATENT DOCUMENTS

| 4,220,057 | A | * | 9/1980 | Kronogard | 60/792 |
| 4,961,721 | A | * | 10/1990 | Sword et al. | 475/47 |
| 7,434,406 | B2 | * | 10/2008 | Herlihy et al. | 60/788 |
| 8,522,526 | B2 | * | 9/2013 | Talan | 60/204 |
| 2008/0081733 | A1 | | 4/2008 | Hattenbach et al. | |

FOREIGN PATENT DOCUMENTS

| EP | 1 995 494 | 11/2008 |
| GB | 1 106 980 | 3/1968 |
| GB | 2 429 500 | 2/2007 |

OTHER PUBLICATIONS

International Search Report Issued Feb. 18, 2011 in PCT/FR10/52432 filed Nov. 16, 2010.

* cited by examiner

*Primary Examiner* — Ha D Ho
(74) *Attorney, Agent, or Firm* — Oblon, Spivak, McClelland, Maier & Neustadt, L.L.P.

(57) ABSTRACT

A device for changing a transmission ratio between a turbine shaft and a shaft of a starter-generator of an aeroengine, the device including: first and second fixed gear wheels carried by the shaft of the starter-generator; first and second idler gearwheels carried by the turbine shaft, and meshing respectively with the first and second fixed gearwheels to define different gear ratios; a changeover sleeve interposed between the idler gearwheels and mechanically coupled to the turbine shaft, the changeover sleeve being movable in translation on the turbine shaft between two coupling positions; and a mechanism causing the changeover sleeve to move in translation automatically from either one of its coupling positions to the other one when the sum of torques between the turbine shaft and the starter-generator shaft changes sign.

9 Claims, 2 Drawing Sheets

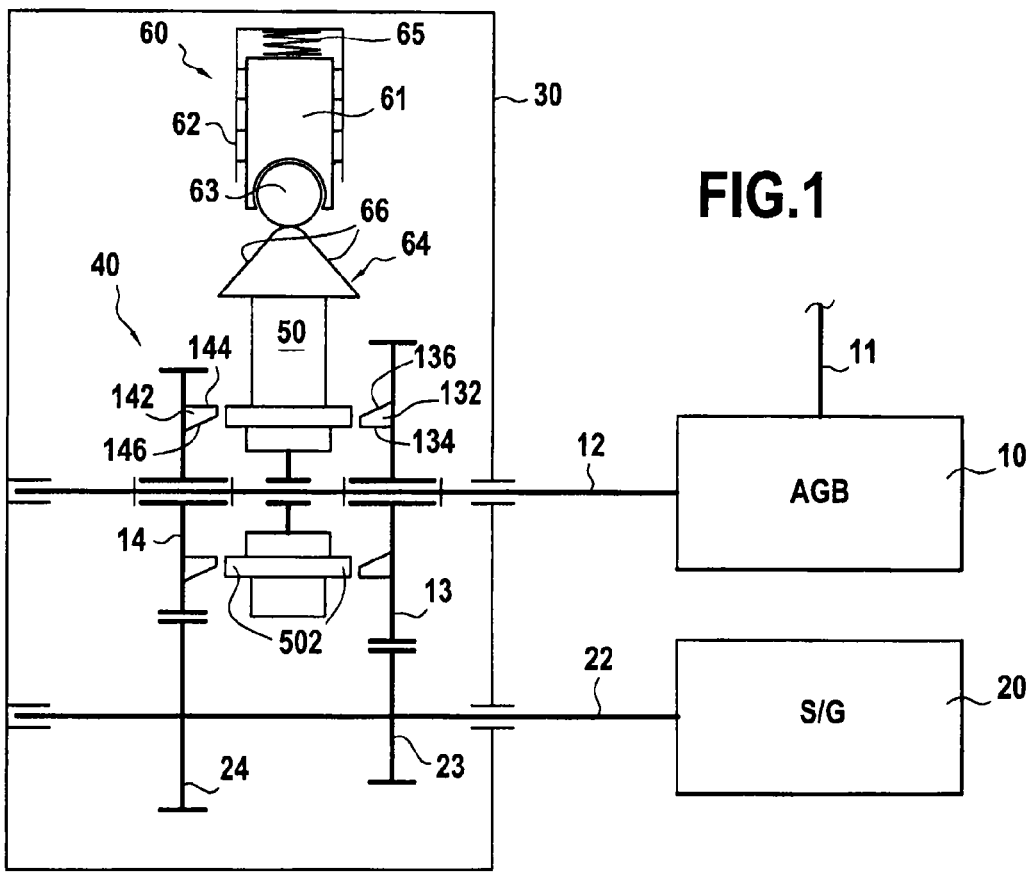
FIG.1
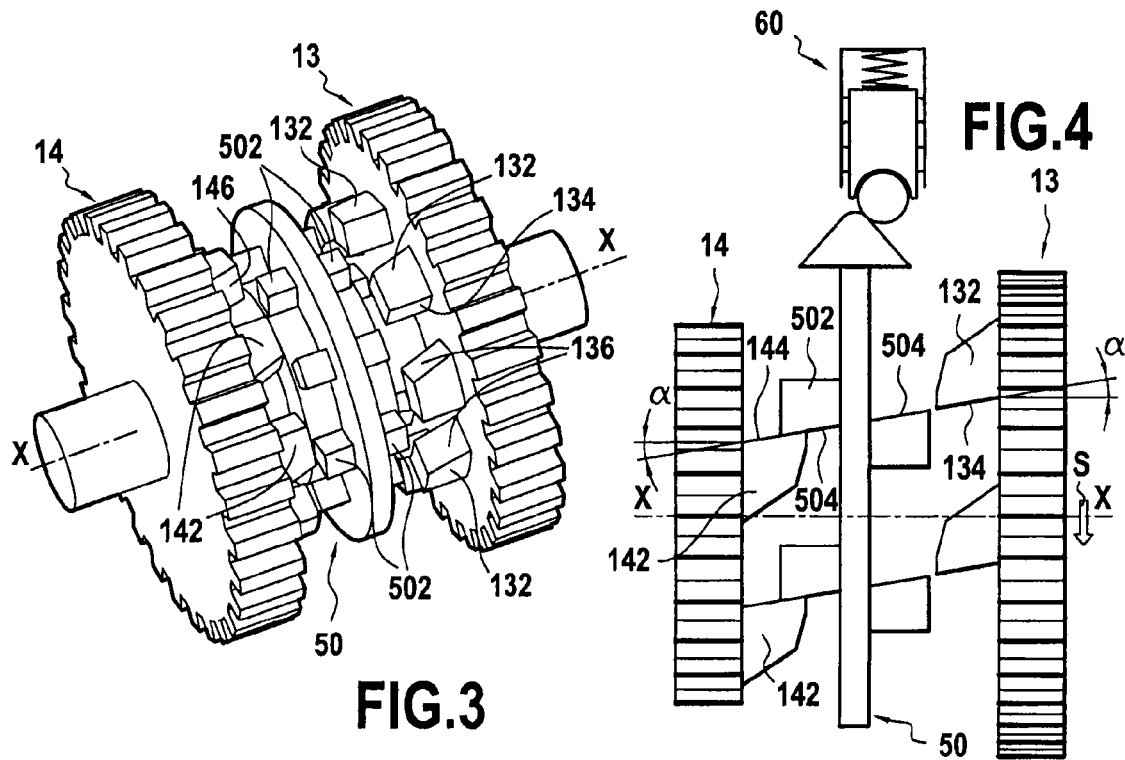
FIG.3
FIG.4

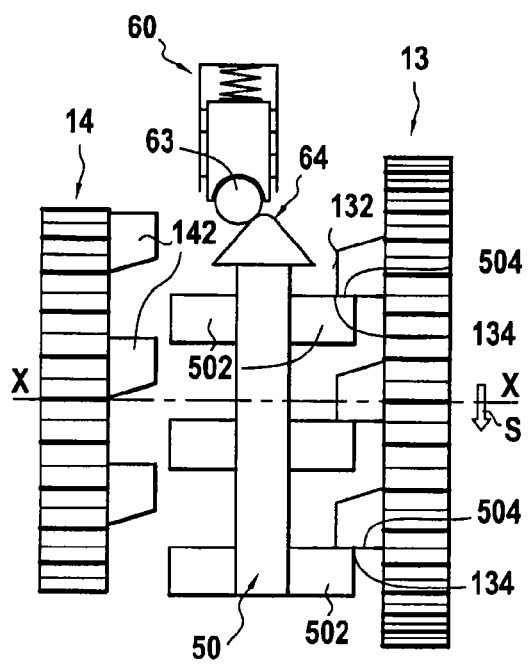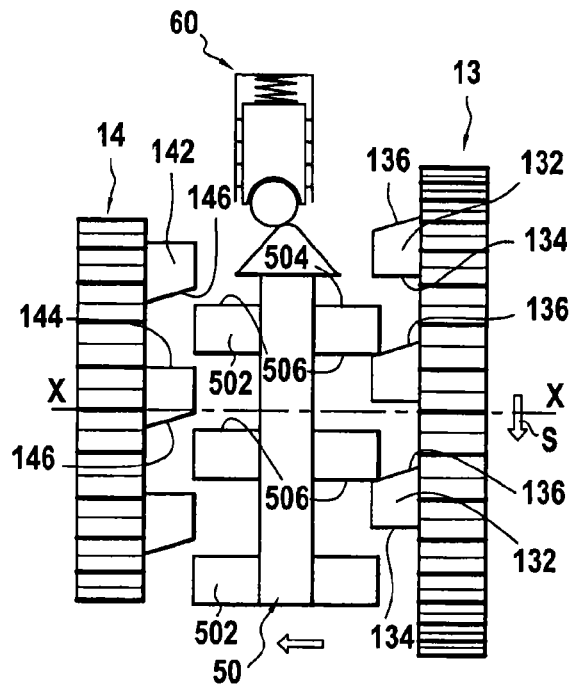
FIG.2A  FIG.2B
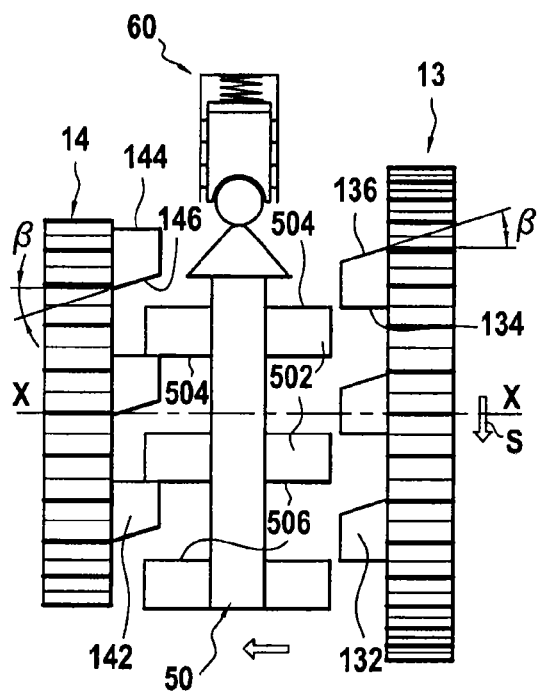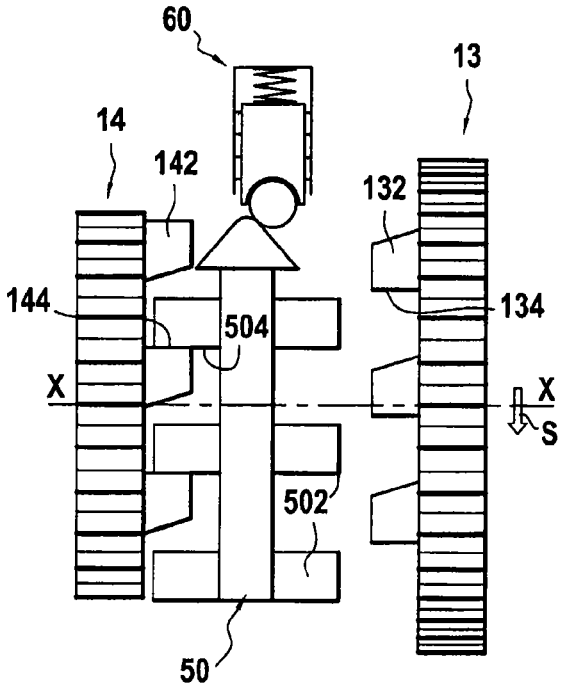
FIG.2C  FIG.2D

DEVICE FOR CHANGING THE TRANSMISSION RATIO BETWEEN A TURBINE SHAFT AND A SHAFT OF A STARTER-GENERATOR OF AN AEROENGINE

BACKGROUND OF THE INVENTION

The present invention relates to the general field of gas turbines, and more particularly to controlling a starter-generator.

The field of application of the invention is that of gas turbines for engines for airplanes or helicopters, and also for auxiliary power units (APUs).

In a gas turbine, a certain number of pieces of equipment, or accessories, are driven by a mechanical transmission from mechanical power taken from a turbine shaft. This mechanical transmission, which is referred to as an accessory gearbox (AGB), comprises a set of gearwheels housed in a casing and mechanically coupled to accessories. These accesses comprise in particular various pumps for producing hydraulic energy, feeding fuel, and providing lubrication, and in certain applications one or more electric starter-generators (S/G). Through the AGB, the speed of the S/G is in particular proportional to the operating speed of the engine, with the coefficient of proportionality corresponding to the gear ratio of the line of gearing in the AGB.

When the gas turbine is in operation, the or each S/G operates as an electricity generator and produces a voltage that powers one or more electricity distribution centers for the aircraft and its engine(s).

When the gas turbine is stationary or rotating slowly, an S/G can operate as a starter by being powered from an external energy source in order to set the gas turbine into operation by rotating the turbine shaft to which the AGB is connected.

The optimum mechanical conditions for operation of an S/G are contradictory depending on whether it is operating as a starter or as a generator.

For given mechanical power, when an S/G is operating as a starter, it is desirable to give precedence to high speeds of rotation in order to minimize the torque of the S/G, while also providing sufficient torque to enable the engine to be started. In the absence of a change of gear ratio, having recourse to a ratio that gives precedence to high speeds in starter mode leads to a wide range of speed variation in generator mode, thereby increasing the frequency range of the S/G in a manner that is prejudicial to integrating it in the electricity network of the aircraft. In particular, the upper limit may be unacceptable (greater than 800 hertz (Hz), which is generally acceptable on certain commercial airplanes).

The gear ratio between the turbine shaft and the S/G is consequently selected so as to provide a usable compromise between operation of the S/G as a starter and as a generator. In certain commercial airplanes, it is generator mode that determines the gear ratio to the detriment of starter mode.

In order to solve this problem, the Applicant has made proposals in patent application number FR 09/54983 for an S/G control system in which a gearbox is interposed between the turbine shaft and the S/G, the gear ratio of said gearbox being changed as a function of the mode of operation of the S/G. Nevertheless, such a system presents the drawback of requiring a device to be added for controlling the change in the gear ratio of the gearbox.

OBJECT AND SUMMARY OF THE INVENTION

A main object of the present invention is thus to mitigate such drawbacks by proposing a device for changing the transmission ratio between the turbine shaft and the shaft of a starter-generator and that does not require having recourse to a control device of that kind.

This object is achieved by a device for changing the transmission ratio between a turbine shaft and a shaft of a starter-generator of an aeroengine, the device comprising:
first and second fixed gearwheels carried by the shaft of the starter-generator;
first and second idler gearwheels carried by the turbine shaft, and meshing respectively with the first and second fixed gearwheels in order to define different gear ratios; and
a changeover sleeve interposed between the idler gearwheels and mechanically coupled to the turbine shaft, the changeover sleeve being movable in translation on said turbine shaft between two coupling positions: a position in which it meshes with the first idler gearwheel, and an opposite position in which it meshes with the second idler gearwheel;
the device being characterized in that it further comprises means for causing the changeover sleeve to move in translation in automatic manner from either one of its coupling positions to the other one when the sum of the torques between the turbine shaft and the starter-generator shaft changes sign.

In order to make the changeover sleeve move in translation from one of its coupling positions to the other, the invention makes provision for taking advantage of operating points of the engine at which the sum of the torques between the turbine shaft and the shaft of the starter-generator changes sign. These operating points correspond to moments when the shaft of the starter-generator changes from driving to being driven (relative to the turbine shaft), and vice versa, i.e. during the transitions between the two modes of operation of the starter-generator while the engine is being started or being stopped. Furthermore, the change in the transmission ratio of the device of the invention takes place automatically, i.e. there is no need for a special control device (such as an electric or hydraulic actuator) for performing this operation (the point at which the ratio changes can be controlled by the torque level of the starter-generator). This results in a device that is reliable, of low weight, and of low-cost.

Advantageously, each of the side faces of the changeover sleeve carries dogs, each dog having:
a first plane face for engaging against a plane torque-transmission face of a tooth carried by one of the idler gearwheels when the sleeve is in one of its coupling positions; and
a second plane face opposite from the first face and intended, when the sum of the torques between the turbine shaft and the shaft of the starter-generator changes sign, to slide over a plane decoupling face of a tooth of one of the idler gearwheels opposite from its torque-transmission face.

The second faces of the dogs of the changeover sleeve may be substantially parallel to the axis of rotation of the changeover sleeve, while the decoupling faces of the teeth of the idler gearwheels may be inclined relative to said axis of rotation in the direction of rotation of said sleeve.

Alternatively, the decoupling faces of the teeth of the idler gearwheels may be substantially parallel to the axis of rotation of the changeover sleeve, while the second faces of the dogs of the changeover sleeve may be inclined relative to said axis of rotation in the direction of rotation of said sleeve.

Furthermore, in a particular embodiment, the first faces of the dogs of the changeover sleeve, and the torque-transmission faces of the teeth of the idler gearwheels are substantially inclined relative to the axis of rotation of the changeover sleeve in the direction of rotation of said sleeve. This angle of inclination enhances retention of the sleeve against the idler gearwheels.

Advantageously, the device further includes means for stabilizing the changeover sleeve in its coupling positions.

The invention also provides an aeroengine including a turbine shaft, a starter-generator, and a device for changing transmission ratio between the turbine shaft and a shaft of the starter-generator as defined above.

BRIEF DESCRIPTION OF THE DRAWINGS

Other characteristics and advantages of the present invention appear from the following description made with reference to the accompanying drawings, which show embodiments having no limiting character. In the figures:

FIG. 1 is a functional diagram of the device for changing transmission ratio between a turbine shaft and a shaft of a starter-generator of the invention;

FIGS. 2A to 2D are diagrams showing the operating principle of the transmission ratio changing device of the invention;

FIG. 3 is a fragmentary view in perspective of the FIG. 1 transmission ratio changing device; and FIG. 4 is a diagrammatic plan view of a transmission ratio changing device in another embodiment of the invention.

DETAILED DESCRIPTION OF EMBODIMENTS

The invention applies to any type of gas turbine engine for aircraft, such as airplanes or helicopters, for example.

In the example described herein with reference to FIG. 1, attention is given more particularly to an airplane turbine engine that includes an accessory gearbox 10 (AGB) that is used for driving accessories of the turbine or auxiliary equipment, such as various pumps for producing hydraulic energy, feeding fuel, providing lubrication, etc., and in particular driving a starter-generator 20 (or S/G).

In known manner, the AGB 10 comprises a plurality of gearwheels (not shown) that are driven in rotation by a power transmission shaft 11, which shaft is mechanically coupled to a shaft of the turbine, thereby enabling the turbine to be started (typically the high-pressure shaft of the turbine engine).

The S/G 20 and how it is operated and regulated are themselves known and are not described herein. By way of example, reference may be made to the description in Publication FR 2 897 895.

The turbine engine also includes a device 30 of the invention enabling the transmission ratio between the turbine shaft and the shaft 22 of the S/G 20 to be changed.

That device comprises in particular a gearbox 40 having two shafts carrying gearwheels: the shaft 22 of the S/G that carries first and second fixed gearwheels 23, 24 that are fixed thereto, and the shaft 12 of the AGB that carries first and second idler gearwheels 13, 14 that are idle and that mesh with the first and second fixed gearwheels respectively.

The first gearwheels 13, 23 define a gear ratio k1 that is different from the gear ratio k2 defined by the second gearwheels 14, 24.

A changeover sleeve 50 is interposed between the idler gearwheels 13, 14 and is mechanically coupled to the shaft 12 of the AGB. This changeover sleeve is suitable for moving in translation on this shaft 12 (e.g. by means of fluting that is not shown in figures) between the two coupling positions: a position in which it meshes with the first idler gearwheel 13 (FIG. 2A) and an opposite position in which it meshes with the second idler gearwheel 14 (FIG. 2D).

To this end, each of the side faces of the changeover sleeve 50 includes a plurality of dogs 502 that are regularly distributed about its axis of rotation X-X. Likewise, on their respective inner side faces, each of the idler gearwheels 13, 14 has a plurality of teeth 132, 142 for meshing with the dogs 502 of the changeover sleeve when it is in its coupling positions.

More precisely, each of the dogs 502 of the changeover sleeve 50 possesses first and second plane faces that are opposite from each other.

The first plane faces 504 of the dogs are designed to engage against torque-transmission plane faces 134, 144 of the corresponding teeth 132, 142 of the idler gearwheels 13, 14 when the changeover sleeve is in its coupling positions.

The first faces 504 of the dogs and the torque-transmission faces 134, 144 of the teeth may be parallel to the axis of rotation X-X of the changeover sleeve (as shown in FIGS. 1 to 3) or else they may be substantially inclined relative to said axis (as shown in FIG. 4). In this second configuration, the angle of inclination of the faces 504, 134, 144 as shown diagrammatically by the angle α in FIG. 4 is directed in the direction of rotation S of the changeover sleeve and may be about 5°. Such an angle of inclination serves to encourage retention of the sleeve against the idler gearwheels.

As for the second plane faces 506 of the dogs 502, when the meshed idler gearwheel 13, 14 brakes, and the changeover sleeve 50 advances relative thereto, said second plane faces are designed to slide over the plane decoupling faces 136, 146 of the corresponding teeth 132, 142 of the idler gearwheels, these decoupling faces being opposite from the torque-transmission faces 134, 144 of the teeth.

In order to obtain such sliding, the second faces 506 of the dogs of the changeover sleeve may be parallel to the axis of rotation X-X of the changeover sleeve, while the decoupling faces 136, 146 of the teeth of the idler gearwheels are inclined relative to that axis. This angle of inclination, shown diagrammatically by the angle β in FIG. 2C, is directed in the direction of rotation S of the sleeve and preferably lies in the range 45° to 60° approximately.

Naturally, an inverse arrangement could lead to the same results: in an embodiment that is not shown, the decoupling faces of the teeth of the idler gearwheels are substantially parallel to the axis of rotation of the changeover sleeve, while the second faces of the dogs of the changeover sleeve are inclined relative to said axis of rotation in the direction opposite to the direction of rotation of said sleeve.

With reference to FIGS. 2A to 2D that show the gearbox in plan view, there follows a description of the operation of the device of the invention.

Prior to actuating the command for starting the turbine engine, the changeover sleeve 50 is in its first coupling position shown diagrammatically in FIG. 2A (meshing with the first idler gearwheel 13).

When the command is actuated, the engine control unit (ECU) modifies the exciter of the S/G so that it changes to starter mode. The shaft 22 of the S/G then drives the shaft 12 of the AGB in rotation (by the changeover sleeve 50 meshing with the first gearwheel 13), and thus drives the turbine shaft for the purpose of starting the turbine engine, this meshing taking place with the gear ratio k1.

Once the turbine engine has started, the turbine shaft (and thus the shaft of the AGB) picks up speed. At a certain stage, the sum of the torques between the shaft 12 of the AGB and the shaft 22 of the S/G will change sign (the shaft of the AGB becoming driving relative to the shaft of the S/G). As a result of this change, the changeover sleeve 50 (coupled to the shaft 12 of the AGB) will tend to turn faster than the first idler gearwheel 13 (coupled to the shaft 22 of the S/G), which slows down. This gives rise to relative angular movement of the dogs 502 of the changeover sleeve relative to the teeth 132 of the first idler gearwheel 13, which movement takes place in the direction of rotation S of the first idler gear wheel. The second faces 506 of the dogs 502 of the changeover sleeve then come against the decoupling faces 136 of the teeth 132 of the first idler gearwheel 13 and they slide over them, thereby moving the sleeve automatically in axial translation towards the second idler gearwheel 14 (FIGS. 2B and 2C).

At the end of its axial stroke, the changeover sleeve will be in its second coupling position shown diagrammatically in FIG. 2D (meshing of the second gearwheel 14 and the changeover sleeve 50). More precisely, the first faces 504 of the dogs 502 of the other side face of the changeover sleeve come into abutment against the torque-transmission faces 144 of the corresponding teeth 142 of the second idle gearwheel 14.

Thus, the turbine shaft (and thus the shaft 12 of the AGB) will drive the shaft 22 of the S/G in rotation with the gear ratio k2.

Naturally, at the end of an identical process, the changeover sleeve can return to its first coupling position as shown in FIG. 2A as soon as the sum of the torques between the turbine shaft and the shaft of the S/G changes sign once again. This will happen in particular while the turbine engine is being stopped, during which process the shaft of the S/G becomes driving relative to the shaft of the AGB.

It can readily be understood from the above that the changeover of the sleeve from either one of its coupling positions to the other coupling position takes place in automatic manner. The particular geometry of the faces of the teeth of the idler gearwheels and of the dogs of the changeover sleeve enable the sleeve to be expelled towards one or the other of the idler gearwheels whenever the sum of the torques between the turbine shaft and the shaft of the S/G changes sign.

According to an advantageous characteristic of the invention, the transmission ratio changing device further includes means 60 for stabilizing the changeover sleeve 50 in each of its coupling positions.

As shown in FIG. 1, these means 60 may be in the form of a ball bushing 61 that is mounted to slide inside a static structure 62 and that has a head 63 that comes to bear against a cam 64 formed on the periphery of the changeover sleeve 50. The ball bushing is also fastened to the end of a return spring 65 having its other end fastened to the structure. The return spring is pre-tensioned in such a manner as to urge the head 63 of the ball bushing continuously against the cam 64.

Furthermore, the cam formed at the periphery of the changeover sleeve presents two slopes 66, each inclined towards a respective one of the idler gearwheels 13, 14. Thus, the only two equilibrium positions of the head of the ball bushing are defined by the two coupling positions of the changeover sleeve. As a result, the presence of the ball bushing serves to stabilize the changeover sleeve in its coupling positions. The ball bushing also facilitates moving the sleeve in translation in order to encourage changing over from either one of its coupling positions to the other.

The invention claimed is:

1. A device for changing the transmission ratio between a turbine shaft and a shaft of a starter-generator of an aeroengine, the device comprising:

first and second fixed gear wheels carried by the shaft of the starter-generator;

first and second idler gearwheels carried by the turbine shaft, and meshing respectively with the first and second fixed gearwheels to define different gear ratios;

a changeover sleeve interposed between the idler gearwheels and mechanically coupled to the turbine shaft, the changeover sleeve being movable in translation on the turbine shaft between two coupling positions of: a position in which it meshes with the first idler gearwheel, and an opposite position in which it meshes with the second idler gearwheel; and means for causing the changeover sleeve to move in translation in automatic manner from either one of its coupling positions to the other one when the sum of torques between the turbine shaft and the starter-generator shaft changes sign.

2. A device according to claim 1, wherein each of the side faces of the changeover sleeve carries dogs, each dog comprising:

a first plane face for engaging against a plane torque-transmission face of a tooth carried by one of the idler gearwheels when the sleeve is in one of its coupling positions; and a second plane face opposite from the first face and configured, when the sum of the torques between the turbine shaft and the shaft of the starter-generator changes sign, to slide over a plane decoupling face of a tooth of one of the idler gearwheels opposite from its torque-transmission face.

3. A device according to claim 2, wherein the second faces of the dogs of the changeover sleeve are substantially parallel to the axis of rotation of the changeover sleeve, while the decoupling faces of the teeth of the idler gearwheels are inclined relative to the axis of rotation in the direction of rotation of the sleeve.

4. A device according to claim 3, wherein the decoupling faces of the teeth of the idler gearwheels form an angle with the axis of rotation of the changeover sleeve, which angle lies in a range of 45° to 60°.

5. A device according to claim 2, wherein the decoupling faces of the teeth of the idler gearwheels are substantially parallel to the axis of rotation of the changeover sleeve, while the second faces of the dogs of the changeover sleeve are inclined relative to the axis of rotation in the direction of rotation of the sleeve.

6. A device according to claim 2, wherein the first faces of the dogs of the changeover sleeve and the torque-transmission faces of the teeth of the idler gearwheels are substantially inclined relative to the axis of rotation of the changeover sleeve in the direction of rotation of the sleeve.

7. A device according to claim 6, wherein the first faces of the dogs of the changeover sleeve and the torque-transmission faces of the teeth of the idler gearwheels form an angle with the axis of rotation of the changeover sleeve, which angle is about 5°.

8. A device according to claim 2, further comprising means for stabilizing the changeover sleeve in its coupling positions.

9. An aeroengine comprising:
a turbine shaft;
a starter-generator; and
a device for changing transmission ratio between the turbine shaft and a shaft of the starter-generator according to claim 1.

* * * * *